United States Patent [19]

Weinhold

[11] 4,074,913
[45] Feb. 21, 1978

[54] DEVICE FOR RELEASABLE FASTENING OF TUBE OR PIPE ENDS

[76] Inventor: Karl Weinhold, Im Jagdfeld 43, 4040 Neuss, Germany

[21] Appl. No.: 690,727

[22] Filed: May 27, 1976

[30] Foreign Application Priority Data

May 27, 1975 Germany .............................. 2523338

[51] Int. Cl.² .......................................... F16L 33/12
[52] U.S. Cl. ..................... 285/114; 285/243
[58] Field of Search .............. 285/243, 252, 407, 408, 285/409, 410, 411, 365, 366, 364, 337, 373, 419, 420, 242, 311, 114

[56] References Cited

U.S. PATENT DOCUMENTS

| 3,026,128 | 3/1962 | Willis | 285/364 X |
| 3,070,388 | 12/1962 | Werth | 285/411 |
| 3,396,993 | 8/1968 | Weinhold | 285/243 X |
| 3,600,770 | 8/1971 | Halling | 285/411 X |

Primary Examiner—Thomas F. Callaghan
Attorney, Agent, or Firm—Sherman & Shalloway

[57] ABSTRACT

A device for releasable fastening of tube or pipe ends comprising two shell parts joined together at one end by a pivot bolt and at the other end by a locking arrangement hinged by another pivot bolt, a connecting tube arrangement associated with the two shell parts for receiving a tube or pipe end, the two shell parts cooperating with the tube or pipe end to retain it in connection with the connecting tube arrangement and a mounting having a central opening by means of which it is located around the connecting tube arrangement, a slot extending from the central opening with a circular path along part of its length and for receiving one of the pivot bolts and an outwardly opening recess in a region opposite to the circular part of the slot for receiving the other pivot bolt.

13 Claims, 2 Drawing Figures

DEVICE FOR RELEASABLE FASTENING OF TUBE OR PIPE ENDS

BACKGROUND OF THE INVENTION

The invention relates to a device for releasable fastening of tube or pipe ends. Such a device may comprise two shell parts connected in a jointed manner at one end respectively by means of a pivot bolt, the shell parts may be locked at their other end by a locking arrangement, such as a toggle type locking arrangement, which is hinged with the aid of a further pivot bolt. The shell parts have holding means for holding the tube or pipe end in connection with a connecting tube arrangement, and with a mounting located around the connecting tube arrangement by means of a circular central opening.

A known embodiment of such a device serves, for example, to fasten a tube end on to a connecting nozzle. The latter has a circular attachment strengthened relative to the connecting nozzle, and two radial mountings are pushed on to the circular attachment. These mountings are held on one side by means of a collar restricting the circular attachment, while a disc which is held by a retaining ring engaging in a circular groove in the circular attachment, is seated on the other side. Each of the two mountings is assigned to one of the pivot bolts, which latter has a circular groove at the end which is matched to the width of the slot in the mounting. When assembling the device, first of all the two pivot bolt ends are pushed into a respective slot of the mounting belonging to it, and subsequently both mountings are seated on the circular attachment with their centre opening and are fastened.

This embodiment has the disadvantage that two mountings of a certain minimum strength are required and that, seen axially of the device, a considerably large construction space is required for these two mountings. Furthermore, it is disadvantageous that the two mountings can always tip against one another in the direction in which they are removed, particularly when the tube end is under stress, as during assembly of the mountings on the circular attachment, small axial play is unavoidable between the mountings.

The next disadvantage is that the manufacture of the mountings, which includes the essential hardening thereof, is very expensive. In addition, the two pivot bolts must have varying lengths, as the mountings have a varying axial spacing from the shell parts.

SUMMARY OF THE INVENTION

It is an object of the invention to improve a device of the type mentioned at the beginning so that manufacture and assembly are simplified.

According to the invention, there is provided, a device for releasable fastening of tube or pipe ends comprising two shell parts, a pivot bolt connecting said two shell parts at one end of said two shell parts, a locking arrangement for connecting said two shell parts at the other end of said two shell parts, a further pivot bolt hinging said locking arrangement, a connecting tube arrangement associated with said two shell parts and for connection to said tube or pipe end, holding means on said two shell parts for holding said tube or pipe end in connection with said connecting tube arrangement when said locking arrangement is actuated and a mounting defining a circular central opening for locating said mounting around said connecting tube arrangement, defining a slot extending from said central opening with a circular path along part of its length and for receiving one of said pivot bolts and defining an outwardly open recess in a region opposite to said part of said slot with said circular path and for receiving the other of said pivot bolts.

BRIEF DESCRIPTION OF THE DRAWINGS

The invention will now be described in greater detail, by way of example, with reference to the drawings, in which.

DESCRIPTION OF THE PREFERRED EMBODIMENTS

Figure 1:
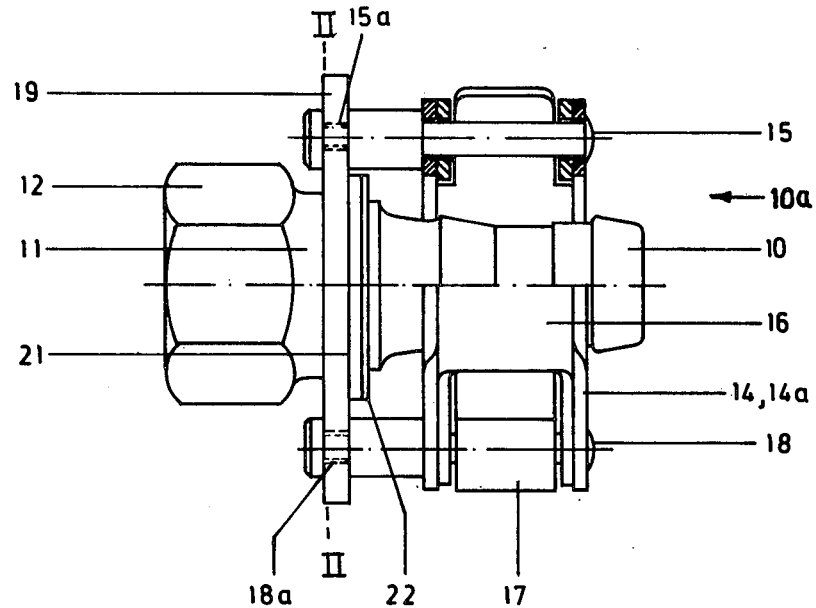
FIG. 1, shows a side view of a device in accordance with the invention.

Basically, in a preferred form of the invention, it is proposed, in a device as mentioned at the outset that the slot of the mounting has a circular path on a part of its length and that the mounting has an outwardly open recess in a curved region opposite to this part, into which recess the other pivot bolt engages.

Preferably, the connecting tube arrangement comprises a connecting nozzle on to which said tube or pipe end can be pushed, or a connecting pipe end to which said tube or pipe end is to be connected and having a collar located thereon. The holding means may comprise radially inwardly directed flanges for pressing a tube or pipe end in the connecting nozzle or for engaging behind a collar or the tube or pipe end.

Because of this construction, both pivot bolts may be fastened to a single mounting. During assembly, the end of one pivot bolt is first passed into the mouth of the slot which starts from the centre opening and is passed towards the circular part of the slot. At the same time, the end of the other pivot bolt is inserted into the outwardly open recess, in which this second pivot bolt is forced to remain as long as the first pivot bolt is located in the circular part of the slot.

The locking arrangement suitably comprises a toggle type clamping arrangement operated by a toggle lever.

The advantage that a shortening of the constructional length may be obtained is achieved by the invention, because a single mounting is sufficient. It is even possible to use a non-hardened mounting as this now represents a unified construction member and substantially more favourable load conditions are present. The advantage of the saving in space in an axial direction is valid even if in this case the mounting is dimensioned so as to be slightly stronger than the known individual mountings.

The next advantage is that the pivot bolts may now have equal lengths. This advantage holds true both for manufacture and for storage. Moreover, in general, manufacture and assembly are simplified by the fact that the two pivot bolts may now be held by only a single constructional part relative to the connecting nozzle or the pipe end.

A further advantage is good self-adjustment of the shell parts when closing the device because of the guidance given by the recess and the slot. On the other hand, this permits in each case adequate opening of the device or pivoting outwards of the shell parts when a tube or pipe end is to be fastened.

In further refinement of the invention, it is proposed that the recess should run radially towards the centre opening of the mounting. Furthermore, it is favourable for the mobility between the connecting nozzle and the remaining parts of the device if the circular part of the slot runs approximately concentric to the pivot bolts held in the recess opposite.

The length of the recess in which the pivot bolt may be displaced should in any case be dimensioned such that the pivot bolt still remains in the recess when the toggle type clamping arrangement is opened.

A particularly advantageous refinement of the invention results when the the circular part of the slot, with respect to the diameter of the mountung running through the centre of the recess, extends from this diameter to one side of the same and if a transition member of the slot connecting this part to the centre opening is offset by a small distance to the other side of the diameter. This transition part may, where it opens into the centre opening runs approximately parallel to the said diameter.

Referring now to the drawings, the device shown serves to receive a tube end, not shown here, which is pushed to a connecting nozzle 10 in the direction indicated by the arrow 10a. For the rest of its length the connecting nozzle 10 changes into a circular attachment 11 of larger diameter. The end opposite the connecting nozzle 10 is constructed as a retaining nut 12 for the attachment of a pipe.

Two shell parts 13 and 14 serve to fasten the tube end to the connecting nozzle 10, and have clamping flanges 13a and 14a extending radially inwards. The shell parts 13 and 14 are jointedly connected together at one end by means of a first pivot bolt 15, while a toggle lever 16 of the toggle type clamping arrangement formed by the latter and a spring 17 is hinged on to the free end of the shell part 14 by means of a further pivot bolt 18. Both pivot bolts 15 and 18 each have a circular groove 15a or 18a at one end, which groove is formed by an appropriate reduction of the diameter of the pivot bolts 15 and 18 relative to the remaining part thereof.

A flat mounting 19 is seated on the circular attachment 11, the centre opening 20 of which mounting is matched in diameter to the outer diameter of the circular attachment 11. Removing the mounting 19 from the circular attachment 11 is prevented by means of a disc 21 which is held by a retaining ring 22 engaging into a groove, not shown here, in the circular attachment 11.

Figure 2:
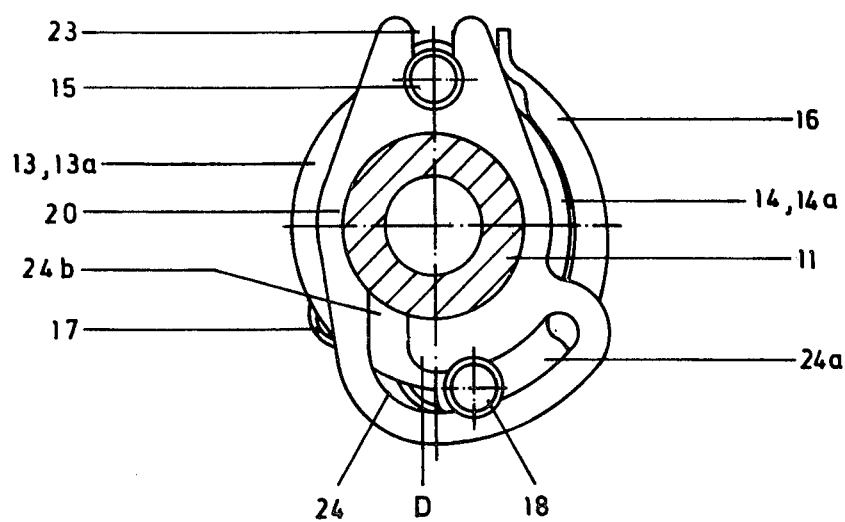
FIG. 2, shows a section along the line II—II of FIG. 1.

As may be seen from FIG. 2, the mounting 19 has a recess 23 which is open outwardly and is associated with the pivot bolt 15, the width of which recess is matched to the outer diameter of the circular groove 15a. If then, the pivot bolt 15 with the circular groove 15a is inserted into the recess 13, the pivot bolt 15 is fixed in an axial direction. The recess 23 runs radially towards the centre opening 20 of the mounting 19.

In contrast, the mounting 19 has a slot 24 which is formed from a circular part 24a and a transition part 24b which connects the former to the centre opening 20. While the circular part 24a of the slot 24 extends from the diameter on which the centre of the recess 23 also lies, in a direction towards the shell part 14 and the toggle lever 16 lying thereon, the point at which the transition part 24b opens into the centre opening 20 lies on the opposite side of the diameter, wherein the transition part 24b lies approximately parallel to the said diameter in the region where it opens into the centre opening 20, which diameter is designated here as D. The width of the slot 24 is matched to the outer diameter of the circular groove 18a of the pivot bolt 18 along its entire path. Thus, the pivot bolt 18 is also held axially on the mounting 19, as soon as it is inserted into the slot 24 with its circular groove 18a. The longitudinal axis of the circular part 24a of the slot 24 moreover runs concentrically to the pivot bolt 15.

When assembling the device, the part formed from the shell parts 13 and 14, the toggle lever 16 with the spring 17 and the pivot bolts 15 and 18 is assembled first of all. Then the pivot bolt 18 is passed from the centre opening 20 into the transition part 24b of the slot 24 and is displaced towards the circular part 24a. At the same time the pivot bolt 15 is passed into the recess 23. Then the mounting 19 may be pushed on to the circular attachment 11. Fastening of the mounting 19 takes place in the manner already described with the aid of the disc 21 and the retaining ring 22.

When closing and opening the toggle lever 16, the pivot bolt 18 is guided in the slot 24. The shell parts 13 and 14 are pivoted sufficiently far apart in the open position in order to be able to push a tube end on to the connection nozzle 10 without difficulty or to be able to remove it from the latter. The recess 23 is dimensioned with a length such that the pivot bolt 15 still remains within it if the farthest opening position has been reached between the shell parts 13 and 14. Moreover, the recess 23 and the slot 24 make possible good self-adjustment of the shell parts 13 and 14 relative to the connection nozzle 10 when closing the device. Moreover, when the device is closed the pivot bolts 15 and 18 lie at least close to a diameter of the device so that active axial forces which are at least approximately symmetrical to the longitudinal axis of the device are transmitted on to the shell parts 13 and 14, for example, when stressing the pipe end in the direction of removal.

It will be understood that the above description of the present invention is susceptible to various modification changes and adaptations.

What I claim is:

1. A device for releasable fastening of tube or pipe ends comprising two shell parts, a pivot bolt connecting said two shell parts at one end of said two shell parts, a locking arrangement for connecting said two shell parts at the other end of said two shell parts, a further pivot bolt hinging said locking arrangement, a connecting tube arrangement associated with said two shell parts and for connection to said tube or pipe end, holding means on said two shell parts for holding said tube or pipe end in connection with said connecting tube arrangement when said locking arrangement is actuated and a mounting plate defining a circular central opening for locating said mounting plate around said connecting tube arrangement, said mounting plate including a slot extending from said central opening with a circular path along part of its length with a radius of curvature centered in said circular central opening, said slot receiving one of said pivot bolts, said mounting plate further including an outwardly open recess in a region opposite to said part of said slot with said circular path and for receiving the other of said pivot bolts.

2. A device as defined in claim 1, wherein said connecting tube arrangement comprises a connecting nozzle on to which said tube or pipe end can be pushed.

3. A device as defined in claim 2, wherein said holding means comprise radially inwardly directed flanges for pressing a tube or pipe end on said connecting nozzle.

4. A device as defined in claim 1, wherein said connecting tube arrangement comprises a connecting pipe end to which said tube or pipe end is to be connected and having a collar located thereon.

5. A device as defined in claim 4, wherein said holding means comprise radially inwardly directed flanges for engaging behind a collar on said tube or pipe end.

6. A device as defined in claim 3, wherein said locking arrangement comprises a toggle type clamping arrangement.

7. A device as defined in claim 6, wherein said other of said pivot bolts is mounted in said recess defined by said mounting plate for radial displacement therein.

8. A device as defined in claim 6, wherein said recess defined by said mounting plate is dimensioned to ensure that the other of said pivot bolts inserted in said recess remains in said recess when said toggle type clamping arrangement is open.

9. A device as defined in claim 6, wherein said circular part of said slot defined by said mounting plate is arranged to run concentrically to said other of said pivot bolts received in said recess defined by said mounting plate.

10. A device as defined in claim 6, wherein said mounting plate defines said circular part of said slot to extend from a diameter running through the centre of said recess defined by said mounting plate to one side of said diameter and defines a transition part of said slot connecting said circular part of said slot to said central opening defined by said mounting as offset a small distance from said diameter where said transition part of said slot enters said central opening and to the other side of said diameter to said circular part of said slot.

11. A device as defined in claim 10, wherein said transition part of said slot defined by said mounting plate comprises a slot running approximately parallel to said diameter in the region of its entry into said central opening defined by said mounting.

12. A device as defined in claim 6, wherein said circular part of said slot defined by said mounting plate extends towards one of said two shell parts on which a toggle lever of said toggle type clamping arrangement rests in its closed position.

13. A device as claimed in claim 1 wherein the mounting plate is a single plate.

* * * * *